Jan. 27, 1953 L. R. HELPERT ET AL 2,627,052

TELEVISION RECEIVER HORIZONTAL DEFLECTION CIRCUIT

Filed April 18, 1951

INVENTORS.
Louis R. Helpert
Henry W. Appel
BY T. L. Bowes
Attorneys

Patented Jan. 27, 1953

2,627,052

UNITED STATES PATENT OFFICE 2,627,052

TELEVISION RECEIVER HORIZONTAL DEFLECTION CIRCUIT

Louis R. Helpert, Rochester, and Henry W. Appel, Penfield, N. Y., assignors to Stromberg-Carlson Company, a corporation of New York Application April 18, 1951, Serial No. 221,672

5 Claims. (Cl. 315—27)

Figures 1, 2:
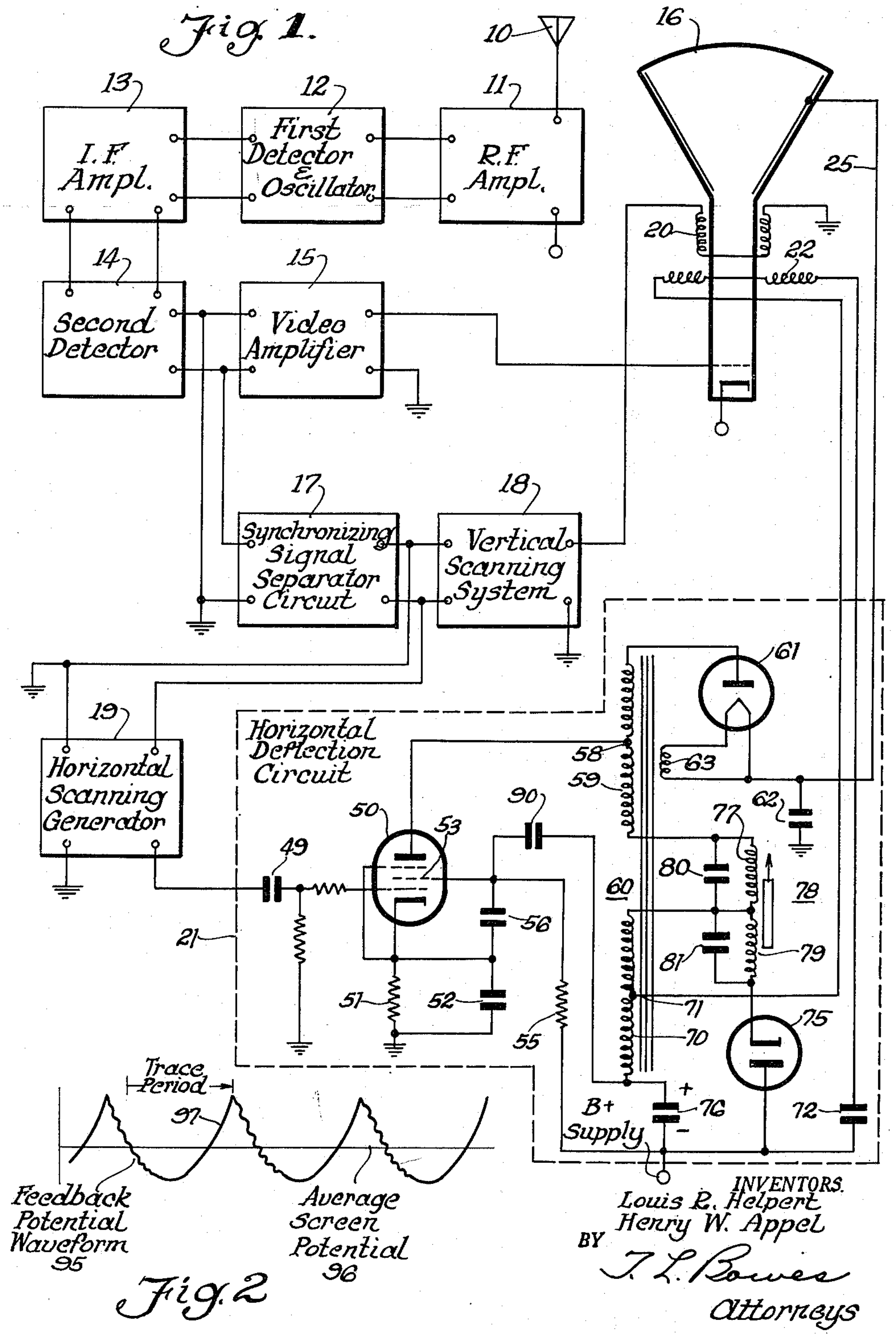

The present invention relates to television receivers and more particularly to horizontal deflection circuits for deflecting the cathode ray beam of a television picture tube. While the invention is of general utility, it is particularly suitable for use with a horizontal deflection circuit of the type which employs a so-called "B" boost circuit for increasing the available supply potential for the horizontal deflection output tube.

In conventional television receivers, it is common practise to employ a horizontal deflection circuit of the electro-magnetic scanning type wherein a horizontal deflection output tube, of relatively high power output, is coupled through an output transformer, which may be of the autotransformer type, to the horizontal scanning yoke which surrounds the neck of the cathode ray tube. A signal of suitable wave form is supplied to the input circuit of the horizontal output tube such that an essentially saw-tooth current is produced in the scanning yoke. During retrace periods, the collapsing magnetic field produces voltage pulses which are stepped up by the autotransformer and rectified to produce a relatively high D. C. potential suitable for energizing the accelerating anode of the cathode ray tube. Conventionally, an efficiency diode is employed which is connected in series with a "B" boost condenser and this series combination is connected across a portion of the autotransformer effectively in shunt with the horizontal scanning yoke. The damping diode conducts during the first thirty or forty percent of the trace to supply scanning current during this interval, and the "B" boost condenser is charged in the correct direction to add to the conventional B+ supply thereby to increase the B+ voltage available for energizing the anode of the horizontal output tube.

In horizontal deflection circuits of the type described above, it is necessary to produce a certain maximum current flow through the scanning yoke in order to provide retrace pulses of sufficiently large amplitude to produce the required accelerating anode voltage. However, this maximum current must come from the horizontal output tube alone, and in many instances, anode current saturation of this tube causes non-linearity at the right hand side of the picture, i. e. at the end of the trace portion of the scanning cycle. If the horizontal output tube is driven harder to correct for non-linearity on the right hand side of the picture, then the maximum anode dissipation of the tube is exceeded. On the other hand, if the output tube excitation is dropped so that the scanning current is linear to the end of the trace and the maximum anode dissipation is not exceeded, then the maximum current is too small and not enough accelerating anode voltage is obtained. Conventionally, a compromise is made in favor of the maximum value of trace current, and the horizontal size and linearity of the picture are sacrificed. It would be desirable to provide both the necessary value of maximum scanning current and a scanning wave form which is linear throughout the trace.

Accordingly, it is an object of the present invention to provide a new and improved horizontal deflection circuit for a television receiver.

It is another object of the present invention to provide a new and improved horizontal deflection circuit for a television receiver wherein substantially increased horizontal size, linearity and recovered high voltage is obtained.

It is a further object of the present invention to provide a new and improved horizontal deflection circuit for a television receiver wherein a substantial increase in the maximum amplitude of the scanning current is obtained without exceeding the average power requirements of the horizontal output tube.

It is still another object of the present invention to provide an improved horizontal deflection circuit for a television receiver wherein an extremely simple and economical arrangement is provided for increasing the size and improving the linearity of the scanning current and the recovered high voltage.

The invention, both as to its organization and method of operation, together with further objects and advantages thereof, will best be understood by reference to the following specification taken in connection with the accompanying drawing, in which:

Fig. 1 is a schematic diagram, partly in block diagram form, of a television receiver embodying the features of the present invention; and Fig. 2 is a graphic illustration of a wave form which occurs in one portion of the television receiver of Fig. 1.

Referring now to the drawing, the system therein illustrated comprises a television receiver of the superheterodyne type including an antenna system 10 which is connected to a radio frequency amplifier 11 to which are connected in cascade in the order named, a first detector and oscillator 12, an intermediate frequency amplifier 13, a second detector 14, a video amplifier 15 and an image reproducing cathode ray tube 16. The output of the second detector 14 is coupled to a synchronizing signal separator circuit, the output of which is supplied to a vertical scanning system 18 and a horizontal scanning generator 19. The vertical scanning system supplies a scanning current at field frequency to the vertical scanning coils 20 which surround the neck of the cathode ray tube 16. The horizontal scanning generator is coupled to a horizontal deflection circuit indicated generally at 21, which provides a saw-tooth current supplied to the horizontal scanning coils 22 which also surround the neck of the cathode ray tube 16. The horizontal deflection circuit 21 also generates the high voltage which is supplied over the conductor 25 to the accelerating anode of the cathode ray tube 16.

The stages or units 10 to 19 inclusive may all be of conventional well known construction so that a detailed illustration and description thereof is unnecessary herein. Referring briefly, however, to the mode of operation of the system described above, television signals intercepted by the antenna 10 are selected, amplified in the radio frequency amplifier 11 and transmitter to the first detector and oscillator 12 wherein they are converted into intermediate frequency signals which, in turn, are selectively amplified in the intermediate frequency amplifier 13 and delivered to the second detector 14. The modulation components of the intermediate frequency signals are detected by the second detector 14 and the video modulation components are supplied to the video frequency amplifier 15 wherein they are further amplified in the usual manner and supplied to the brilliance control electrode of the image producing device 16. The composite television signal is supplied to the synchronizing signal separator circuit 17 which separates the synchronizing signals from the video signals and supplies separate horizontal and vertical synchronizing signals to the units 18 and 19 respectively. Synchronized horizontal and vertical scanning waves controlled by the horizontal and vertical synchronizing signals respectively are generated in the units 18 and 19 and are applied to the scanning coils 20 and 22 so as to produce electromagnetic scanning fields thereby to deflect the scanning ray in two directions perpendicular to each other so as to trace a rectilinear scanning pattern on the screen and reconstruct the transmitted image.

Referring now more particularly to the portions of the system of Fig. 1 embodying the features of the present invention, the horizontal deflection circuit 21 is supplied with a suitable saw-tooth scanning wave from the horizontal scanning generator 19. In general, the horizontal deflection circuit 21 comprises a horizontal output or driver tube 50 which is coupled through a horizontal output transformer indicated generally at 60 to the horizontal scanning coils 22 so as to supply a saw-tooth scanning current at the frequency of the horizontal scanning signal to the coils 22. More specifically, the saw-tooth scanning wave from the generator 19 is coupled through the condenser 49 to the control grid of the output tube 50. The cathode of the output tube 50 is biased by means of the resistor 51 and the shunt condenser 52 which are connected to ground. The screen grid 53 of the tube 50 is connected through a conventional screen dropping resistor 55 to the B+ supply and a screen by-pass condenser 56 is connected from the screen grid 53 to the cathode of the tube 50. The anode of the tube 50 is connected to a tap 58 on a first winding 59 of the output autotransformer 60. Voltage pulses which are produced during retrace periods across the winding 59 of the transformer 60 are rectified in the circuit including the high voltage rectifier 61 and the filter condenser 62 and the unidirectional high voltage thus obtained is supplied over the conductor 25 to the accelerating anode of the cathode ray tube. The cathode of the high voltage rectifier 61 is energized by means of a separate winding 63 on the horizontal output transformer 60.

The deflection current produced in the winding 59 of the transformer 60 also flows through a second winding 70 thereof and is supplied to the scanning coils 22. More specifically, one end of the coils 22 is connected to a tap 71 on the second winding 70 and the other end of the scanning coils 22 is connected through the condenser 72 to the B+ terminal. In accordance with well known principles of reaction scanning, an efficiency diode 75 is effectively connected in shunt with the scanning coils 22 so as to recover a portion of the energy cyclically stored in the electromagnetic system and a "B" boost condenser 76 is connected in series with the winding 70 so as to feed back into the deflection system energy which has been recovered in the form of an increased B+ supply potential.

In order to control the linearity of the scanning current during the middle portion of the trace period, there is provided an autotransformer 78 having the upper section 77 thereof galvanically connected between the lower end of the winding 59 and the upper end of the winding 70 of the horizontal output transformer 60. The lower section 79 of the autotransformer 78 is connected in series with the cathode of the damping tube 75 to the upper end of the winding 70. Condensers 80 and 81 are respectively connected across the autotransformer sections 77 and 79 so as to control the resonant frequency thereof and thereby to control in part the deflection wave form. In this connection it will be understood that the linearity transformer 78 affects only the linearity of the middle portion of the trace, i. e. during the period when scanning current flow shifts from the diode 75 to the horizontal output tube 50 and the transformer 78 does not correct for any non-linearity which may occur at the right hand side of the picture due to anode current saturation in the output tube 50, or the like.

Considering now the general operation of the horizontal deflection circuit described thus far, the bias voltage on the horizontal output tube 50 is adjusted in accordance with well known reaction scanning principles so that the driving saw-tooth wave provided by the generator 19 produces anode current flow in the tube 50 during approximately the last sixty percent of the deflection cycle. Accordingly, a deflection current is produced in the scanning coils 22 during this interval so as to cause a horizontal deflection of the cathode ray tube beam. At the end of the deflection cycle the tube 50 is rendered non-conductive and the magnetic field in the transformer 60 and scanning coils 22 collapses so that the energy stored therein begins to oscillate at its self-resonant frequency which is conventionally several times greater than the deflection frequency. After one half cycle of free oscillation, the voltage appearing across the winding 70 is of the proper polarity to cause the efficiency diode 75 to conduct and thereby capture the energy magnetically stored in the scanning coils at this time. When the diode 75 conducts, the condenser 76, which is in series circuit relation thereto, is charged so as to acquire a potential thereacross of the polarity shown in the drawing. From an inspection of the drawing, it is evident that the voltage across the condenser 76 is in series aiding relation to the B+ potential and anode voltage for the tube 50 is supplied from the B+ terminal, through the condenser 76, the winding 70, the upper section 77 of the autotransformer 78 and the lower portion of the winding 59 to the anode of the tube 50. The current flow through the rectifier 75 provides, in accordance with well known reaction scanning principles, approximately the first forty percent of the saw-tooth current through the scanning coils 22.

According to the present invention there is provided an extremely simple and economical circuit arrangement whereby the size and linearity of the deflection current and the value of the beam acceleration potential produced across the condenser 62 are substantially increased. Furthermore, the above-described improvements in the horizontal deflection circuit are achieved without sacrificing in the least the quality of the deflection circuit in other respects.

In general, the present invention consists in feeding back to the horizontal output tube 50, a voltage having a wave form which includes a rising characteristic at the end of the trace period, while maintaining the average power consumed substantially constant so as not to exceed the maximum power rating of the output tube. To this end, a feedback potential of the correct wave form is coupled on an alternating current basis from the efficiency diode circuit to the screen grid of the horizontal output tube. While the voltage at any point in the efficiency diode series path is satisfactory as a source of feedback potential, the feedback potential is preferably derived from the bottom end of the winding 70 so that a maximum voltage is available and the resonant frequency of the linearity transformer circuit is not disturbed.

More specifically, there is provided in accordance with the present invention a feedback circuit including a feedback condenser 90 which is connected from the bottom end of the winding 70 to the screen grid 53 of the horizontal output tube 50. The potential at the bottom end of the winding 59, which is fed back to the output tube by means of the condenser 90, comprises a partially filtered deflection wave which includes a positively increasing portion during approximately the last half of the trace period.

As discussed heretofore, the screen grid 53 of the horizontal output tube 50 is by-passed to a point of fixed potential by means of the screen by-pass condenser 56. In the illustrated embodiment the condenser 56 is shown connected to the cathode of the output tube 50 although it will be understood that this condenser might equally well be connected to ground. It is essential to by-pass the screen grid 53 to prevent degenerative variations in the screen potential at deflection frequencies which could materially reduce the value of the derived deflection current. The linearity feedback circuit of the present invention permits the screen grid of the output tube to be by-passed at deflection frequencies while increasing the screen grid potential at the end of the trace period to increase the maximum anode current flowing through the output transformer 60. This is accomplished by providing a feedback potential source of sufficiently low impedance to drive the low impedance screen grid circuit including the condensers 56 and 90. Specifically, the bottom end of the winding 70 is employed as a low impedance source of feedback potential which is coupled back to the screen grid of the output tube in the manner described above.

In accordance with a further feature of the present invention, the magnitude of the feedback potential may be controlled so that the correct amount of feedback to produce the desired deflection current may be employed. Specifically, the capacitance value of the condenser 90 bears a predetermined relationship to the capacitance value of the condenser 56 such that a predetermined percentage of the voltage at the feedback point is supplied to the screen grid of the output tube. In this connection it will be understood from the foregoing description that the condensers 90 and 56 constitute a voltage divider network which is connected from the feedback point to a point of fixed potential. Hence the amount of feedback voltage supplied to the screen grid varies inversely with the capacitance values of these condensers, the larger voltage appearing across the smaller condenser.

While the provision of a screen grid by-pass condenser 56 is preferable from the standpoint of permitting an adjustment of the magnitude of the feedback potential as described above, it will be understood that the screen grid condenser 56 may be omitted if desired. The omission of the condenser 56 is permissible due to the fact that the feedback point is of sufficiently low impedance to ground to provide an effective by-pass for the screen grid circuit. In other words the feedback condenser 90 itself acts as a screen by-pass condenser to prevent degenerative variations in screen potential as well as coupling the feedback potential to the screen grid in the manner described above.

Considering now the operation of the above-described circuit for improving the horizontal size, linearity and accelerating anode potential, it will be evident from the general description of the horizontal deflection circuit given above that the horizontal output tube 50 is cut off for approximately the first 30 to 40 percent of the trace period and deflection current during this period is recovered from the energy stored in the inductive portions of the deflection system in accordance with well known reaction scanning principle. During this period, the output tube 50 is unaffected by any feedback potential supplied to the screen grid thereof and hence the wave shape of this portion of the deflection current is also unaffected by the above-described feedback circuit. However, the output tube 50 is heavily conductive during the last half of the trace period and the rising characteristic of the feedback potential applied to the screen grid thereof in the manner described above effects a substantial increase in the anode current of the output tube which, in turn produces a substantial increase in the size of the right hand side of the reproduced picture and in the accelerating anode potential produced across the condenser 62. The ratio of the condensers 90 and 56 may be chosen to provide the correct amount of feedback potential to produce a linear scanning wave form.

In order to illustrate more clearly the manner in which the above-described feedback potential operates to increase the maximum anode current which may be produced by the horizontal output tube 50 without at the same time increasing the average power requirements of this tube, there is shown in Fig. 2 the wave form of a typical feedback potential which is applied to the screen grid of the output tube 50. Referring to this figure, the feedback potential has a wave form which is indicated generally at 95 and is of modified saw-tooth configuration. The average screen potential is indicated by the line 96 and it is evident from an inspection of Fig. 2 that the feedback potential varies from a negative to a positive potential on either side of the average screen potential 96. During approximately the first two-thirds of the trade period, the feedback potential is negative relative to the average screen potential so that the output tube 50 is operating during this period with a substantially reduced screen grid potential. During this period the scanning current is not limited by anode current saturation and accordingly, the screen potential may be made more negative without destroying the linearity of the scanning current. However, during approximately the last one-third of the trace period, the feedback potential increases positively with respect to the average screen potential, as indicated at 97, and the increasing screen potential produced during this period permits the anode current of the output tube 50 to be raised to a higher value without encountering anode current saturation and the non-linearity of scanning current which results therefrom. It is thus evident that the feedback wave potential which is derived from the efficiency diode circuit is of the correct polarity to increase the screen potential during approximately the last one-third of the trace period and furthermore decreases the screen potential during the initial portion of the trace so that the average screen potential remains substantially constant.

While there has been described what is at present considered to be the preferred embodiment of the invention, it will be understood that various modifications may be made therein which are within the true spirit and scope of the invention as defined in the appended claims.

What is claimed as new and desired to be secured by Letters Patent of the United States is:

1. In a cathode ray beam deflection circuit employing an electromagnetic deflection yoke coupled to the anode-cathode circuit of a deflection output tube through an output transformer and having an efficiency diode connected in series with a boost condenser across a portion of the output transformer to develop across said condenser a voltage representative of recovered energy cyclically stored in the inductive portions of the deflection system, means for improving the linearity and increasing the size of the saw-tooth current in the deflection yoke, comprising a condenser connected from a point on said efficiency diode circuit to a control grid of said output tube, said condenser having sufficient capacitance value to increase the potential of said control grid during the latter portion of the deflection cycle.

2. In a cathode ray beam deflection circuit employing an electromagnetic deflection yoke coupled to the anode-cathode circuit of a deflection output tube through an output transformer and having an efficiency diode connected in series with a boost condenser across a portion of the output transformer to develop across said boost condenser a voltage representative of recovered energy cyclically stored in the inductive portions of the deflection system, means for improving the linearity and increasing the size of the saw-tooth current in the deflection yoke, comprising a first condenser connected from a point on said efficiency diode circuit to the screen grid of said output tube, and a second condenser connected from the screen grid of said output tube to a point of fixed potential, said second condenser being sufficiently large to decouple said screen grid at deflection frequency, said first condenser being of sufficient size relative to said second condenser to supply a positively increasing potential to said screen grid during the latter portion of the deflection cycle.

3. In a cathode ray beam deflection circuit employing an electromagnetic deflection yoke coupled to the anode-cathode circuit of a deflection output tube through an output transformer and having an efficiency diode connected in series with a boost condenser across a portion of the output transformer to develop across said boost condenser a voltage representative of recovered energy cyclically stored in the inductive portions of the deflection system, means for improving the linearity and increasing the size of the saw-tooth current in the deflection yoke, comprising a feedback condenser connected from a point on said efficiency diode circuit to the screen grid of said output tube, the impedance of said efficiency diode connection point to ground being sufficiently low to permit said feedback condenser to act as a screen by-pass condenser while at the same time supplying a feedback potential from said efficiency diode circuit to the screen grid of said output tube, thereby to increase the potential of said screen grid during the latter portion of the deflection cycle.

4. A cathode ray tube deflection circuit comprising a scanning inductance, a driver tube, inductive means for coupling said tube to said scanning inductance, a damping tube effectively connected in parallel with said scanning inductance, means including a boost condenser in series with said damping tube for deriving a control potential having a negative value during the first portion of a trace period and having a positively increasing value during the final portion of a trace period, and means for feeding back said control potential to a control grid of said driver tube, thereby substantially to increase the maximum value of linear saw-tooth current which may be obtained from said driver tube without appreciably increasing the average power dissipation therein.

5. A cathode ray tube deflection circuit, comprising a scanning coil, a driver tube, a transformer for coupling said driver tube to said scanning coil, a series circuit comprising an efficiency diode and a boost condenser connected across a portion of said transformer, means for deriving from the junction point of said series circuit and said transformer a control potential having a negatively increasing value during a first portion of a trace period and having a positively increasing portion during a second portion of a trace period, and means for feeding back said control potential to the screen grid of said driver tube.

LOUIS R. HELPERT.
HENRY W. APPEL.

REFERENCES CITED

The following references are of record in the file of this patent:

UNITED STATES PATENTS

| Number | Name | Date |
|---|---|---|
| 2,443,030 | Foster | June 8, 1948 |
| 2,510,027 | Torsch | May 30, 1950 |
| 2,543,305 | Schwarz | Feb. 27, 1951 |
| 2,545,346 | Edelsohn | Mar. 13, 1951 |
| 2,553,360 | Court | May 15, 1951 |
| 2,579,627 | Tourshou | Dec. 25, 1951 |